United States Patent [19]
Cheng

[11] Patent Number: 6,130,983
[45] Date of Patent: Oct. 10, 2000

[54] ROTATABLE L-SHAPED FIBER OPTIC CONNECTOR

[76] Inventor: Yu-Feng Cheng, No. 7, Fuhsing St., Tucheng Ind. Dist., Tucheng City, Taipei Hsien, Taiwan

[21] Appl. No.: 09/221,652

[22] Filed: Dec. 23, 1998

[51] Int. Cl.[7] .................................................. G02B 6/00
[52] U.S. Cl. ........................... 385/139; 385/136; 385/137
[58] Field of Search ..................................... 385/139, 136, 385/137, 134, 76, 77

[56] References Cited

U.S. PATENT DOCUMENTS 5,010,822  4/1991  Folsom ................... 102/201
5,138,678  8/1992  Briggs et al. .............. 385/86
5,521,998  5/1996  Walles et al. .............. 385/86

Primary Examiner—Frank G. Font
Assistant Examiner—Roy M. Punnoose
Attorney, Agent, or Firm—Holland & Hart LLP

[57] ABSTRACT

A rotatable L-shaped fiber optic connector is disclosed, which includes an L-shaped body, a plug partially embedded into the body, a hollow head and a locking key. The L-shaped body has an arcuate path defined therein guiding a fiber optic wire. The plug has an inner space extended therethrough to have the fiber optic wire inserted therein. The hollow head, which is arranged around the plug, is rotatably secured to the plug with the use of the locking key.

10 Claims, 4 Drawing Sheets

ROTATABLE L-SHAPED FIBER OPTIC CONNECTOR

BACKGROUND OF THE INVENTION

1. Field of the Invention

The present invention relates to a fiber optic connector, more particularly, to a rotatable L-shaped fiber optic connector.

2. Description of Related Art

A conventional fiber optic connector is shown in FIG. 5, which includes a body (53) and a head (52) integrally formed together. The head (52) is substantially shaped to be a hollow rectangular box to match with a corresponding fiber optic socket (not shown). A plug terminal (51), integrally formed with the body (53), is provided in the head (52). The shape of the body (53) is substantially a cylindrical tube having two opposed flat faces (531) with a locking slot (532) defined therethrough to hold a clamp piece (533). The clamp piece (533) is substantially rectangular and has a wire slot (534) defined in the center portion thereof for clamping and securing a fiber optic wire (55).

With reference to FIG. 6, the fiber optic connector sequentially defines, starting from its front terminal, a narrow hollow segment (535), a medium hollow segment (536) and a wide hollow segment (537) to hold an inserted fiber optic wire (55). The outer covering (553) of the front portion of the fiber optic wire (55) is peeled off thereby exposing the filament (551) and inner covering (552) as shown in FIG. 5. The lengths of the exposed filament (551) and inner covering (552) are approximately equal to those of the wide and medium hollow segment (535, 536), respectively, thereby securely positioning the fiber optic wire (55) inside the fiber optic connector.

Due to the transmission characteristic of a fiber optic wire, the described conventional fiber optic connector always has a straight shaped body instead of the L-shaped body commonly provided for an audio connector or a D.C. power plug. It is hard to produce an L-shaped fiber optic connector because a fiber optic wire cannot make a turn with a relatively large angle therein and maintain the light transmission characteristics. However, the straight-shaped fiber optic connector suffers a disadvantage in that it always protrudes significantly outward from its socket and easy to be bumped away. Especially when the fiber optic connector is plugged into a CD device, the excessive protrusion of the fiber optic connector may cause inappropriate positioning of the CD device. Therefore, there is a need for the above optic fiber connector to be improved.

SUMMARY OF THE INVENTION

The objective of the present invention is to provide a rotatable L-shaped fiber optic connector which eliminates the inconvenience in use of a straight-shaped fiber optic connector and still maintains the transmission performance.

To achieve the objective, the rotatable L-shaped fiber optic connector of the present invention includes an L-shaped body, a plug, a hollow head and a locking key. The L-shaped body has a bottom face and an outlet face, and an arcuate path defined therein for extending a fiber optic wire from the bottom face to the outlet face. The plug has an inner space extending therethrough in which a fiber optic wire is inserted, a front portion for exposing the fiber optic filament, an end portion embedded into the outlet face of the L-shaped body, and a medium portion with an annular groove defined in a periphery thereof. The hollow head, which is arranged around the plug, has an upper wall and a lower wall with an inserting slot defined therethrough. The locking key has a cutout defined therein to insert into the inserting slot of the head so that the plug extends through the cutout and the locking key cutout is inserted into the annular groove whereby the head is rotatably secured to the plug.

Other objectives, advantages, and novel features of the invention will become more apparent from the following detailed description when taken in conjunction with the accompanying drawings.

DETAILED DESCRIPTION OF PREFERRED EMBODIMENT

Figure 1:
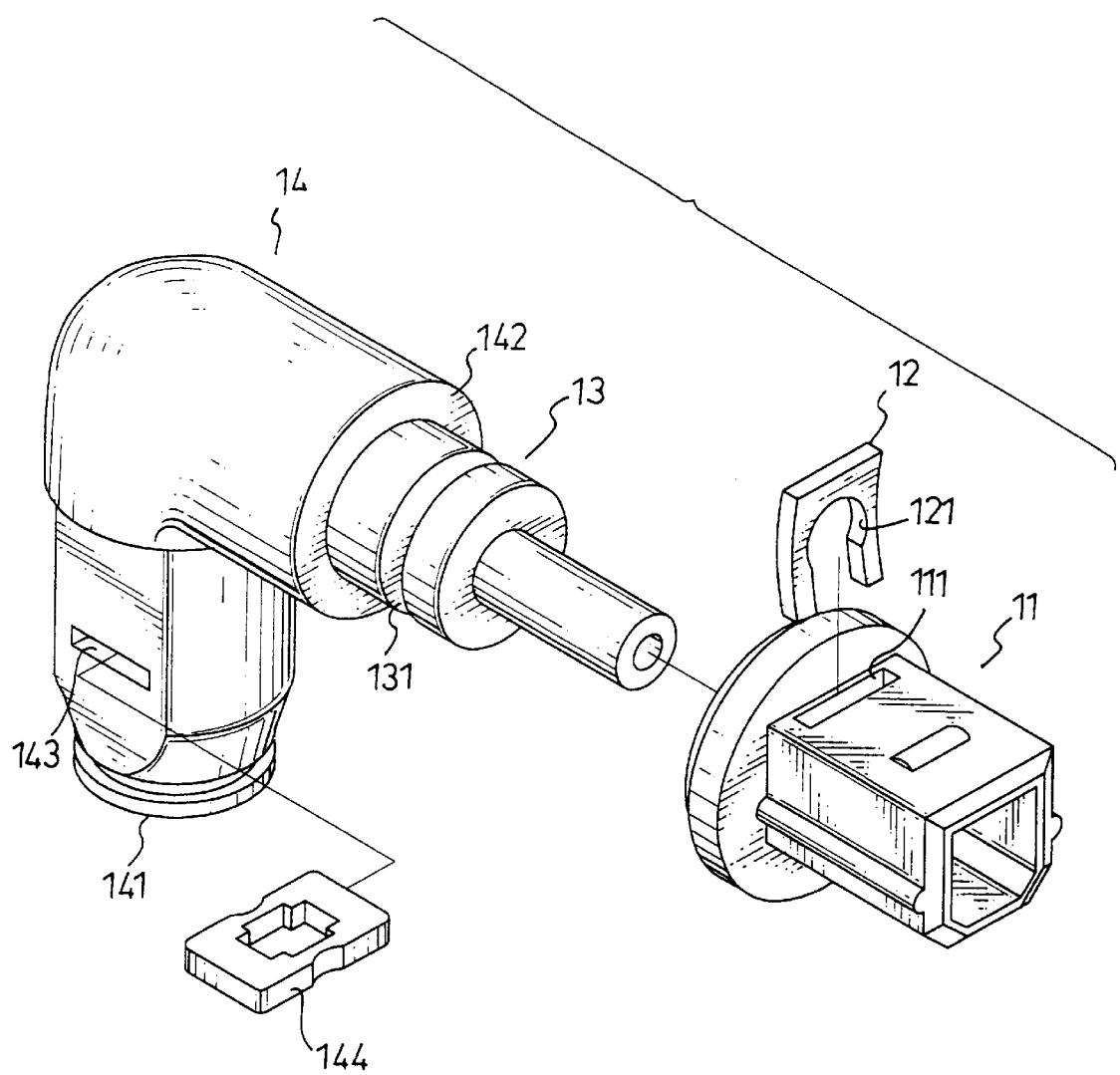
FIG. 1 is an exploded view of the rotatable L-shaped fiber optic connector in accordance with the present invention.

With reference to FIG. 1, the rotatable L-shaped fiber optic connector in accordance with the present invention is shown to have a head (11), a locking key (12), a plug (13) and a body (14). The body (14) is designed to have an L-shape with a bottom face (141) and an outlet face (142) wherein a fiber optic wire (not shown) is inserted into the bottom face (141) and extends through the body (14) out the outlet face (142) to the plug (13). The plug (13) is preferably made of metal and substantially hollow cylindrical in shape thereby providing an inner space extended therethrough to insert and hold a fiber optic wire. The front portion of the plug (13) has a relatively small diameter. The medium portion of the plug (13) has an annular groove (131) defined in the periphery thereof. The end portion of the plug (13) is embedded into the outlet face (142) of the L-shaped body (14). The head (11) is hollow, and the shape of the head (11) is designed to match a corresponding socket. The head (11) has an upper wall and a lower wall defining an inserting slot (111) therethrough. The locking key (12) is slightly bent in shape and has a cutout (121) defined therein.

Figure 2:
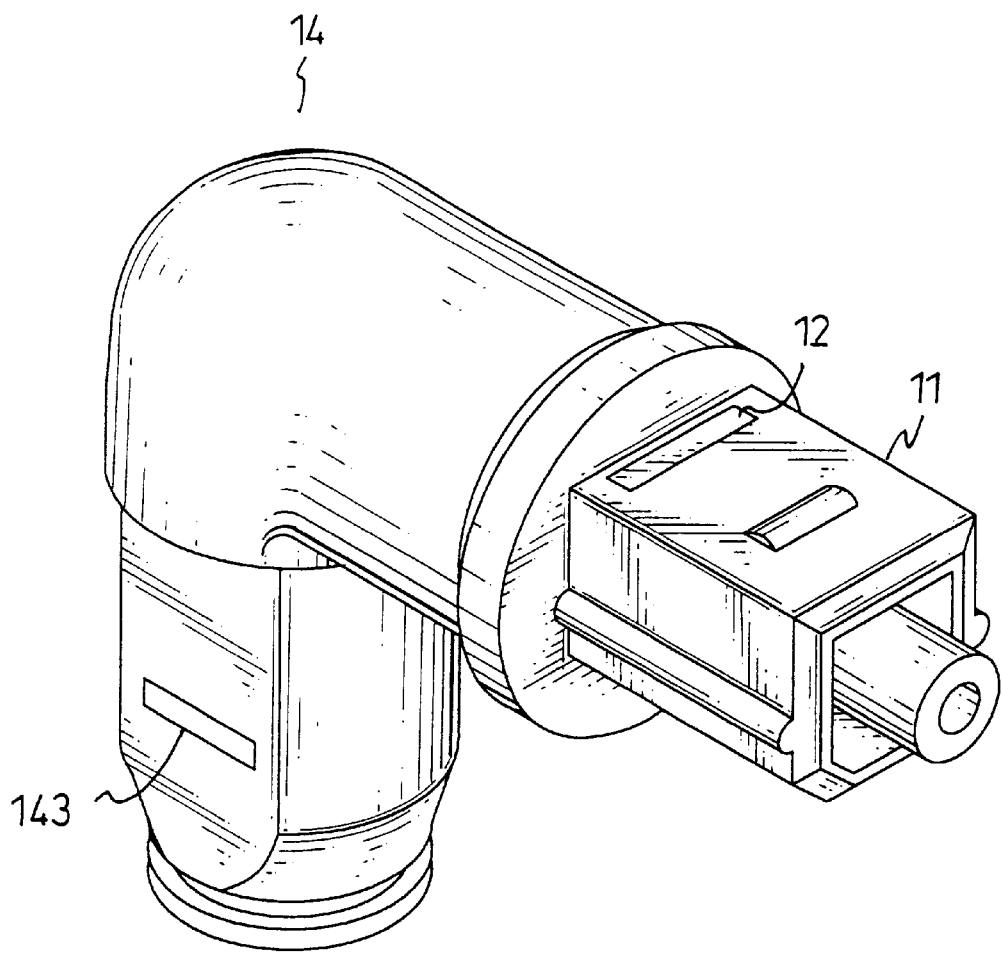
FIG. 2 is a perspective view of the rotatable L-shaped fiber optic connector in accordance with the present invention.
Figure 3:
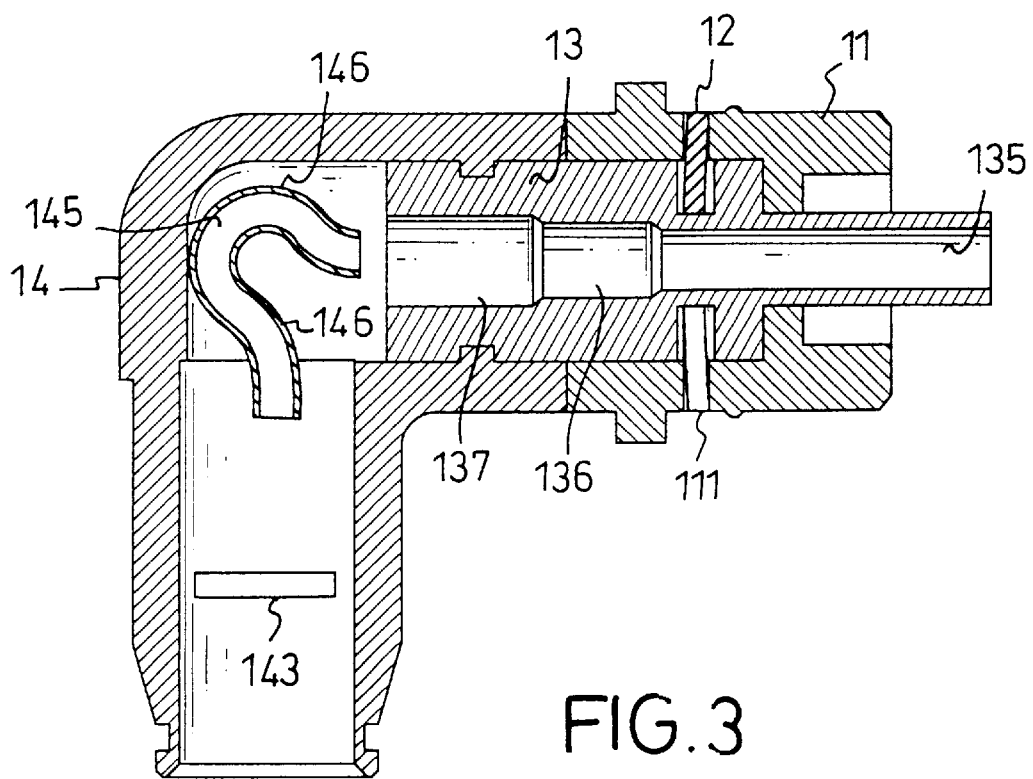
FIG. 3 is a side cross-section of an embodiment of the rotatable L-shaped fiber optic connector in accordance with the present invention.
Figure 5:
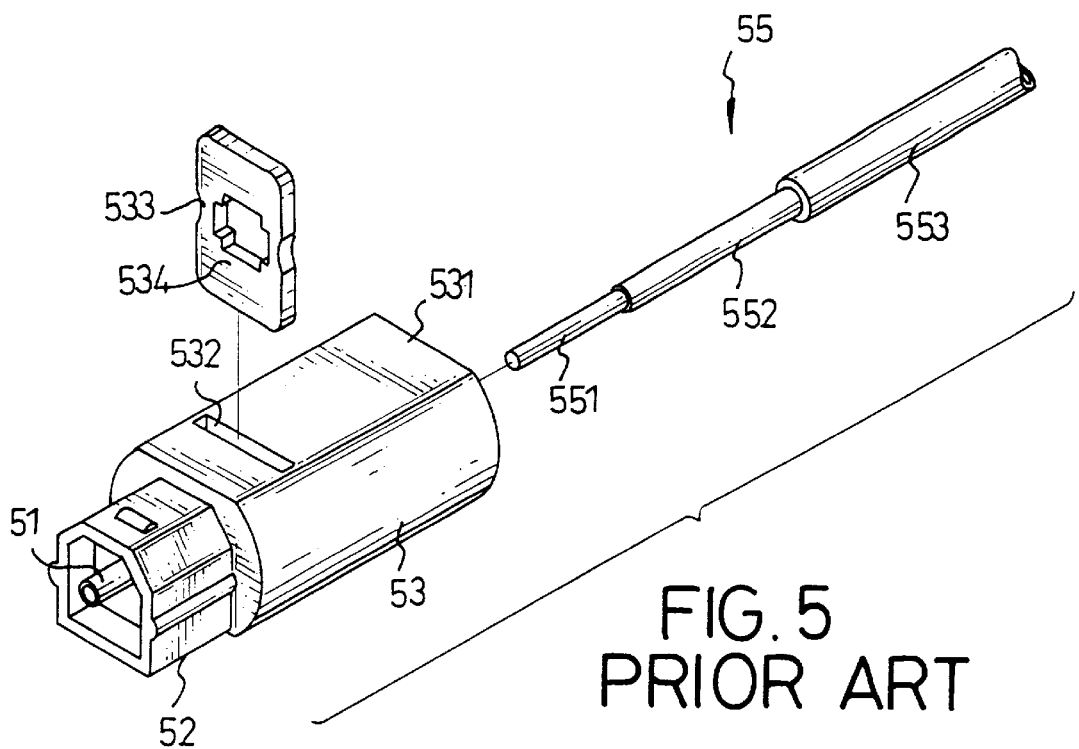
FIG. 5 is a perspective view of a conventional fiber optic connector.
Figure 6:
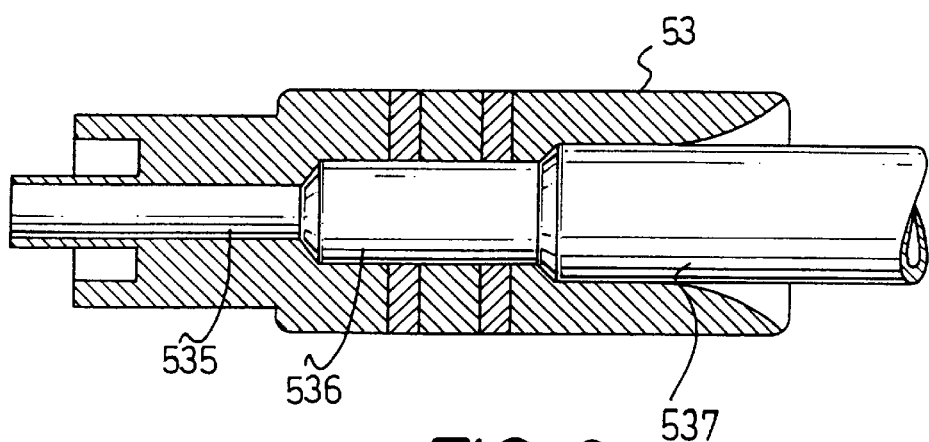
FIG. 6 is a side cross-section of a conventional fiber optic connector.

With reference to FIG. 2 and FIG. 3, the head (11) is arranged around the plug (13) in such a manner that the front terminal of the plug (13) slightly protrudes from the front plane of the head (11). The locking key (12) is inserted into the inserting slot (111) of the head (11) so that the plug (13) extends through the cutout (121) of the locking key (12) and the locking key (12) cutout (121) is inserted into the annular groove (131) of the plug (13). Therefore, the locking key (12) is disposed in the inserting slot (111) of the head (11) and detachably engaged with the annular groove (131) of the plug (13). Because the locking key (12) is slightly bent, an elastic force is generated when the locking key (12) is inserted into the inserting slot (111) thereby better securing the locking key (12) in the inserting slot (111). Because the locking key (12) cutout is inserted into the annular groove (131) of the plug (13), the head (11) can be secured to the plug (13) and freely rotated with the central line of the plug (13) as the rotating axis.

Figure 4:
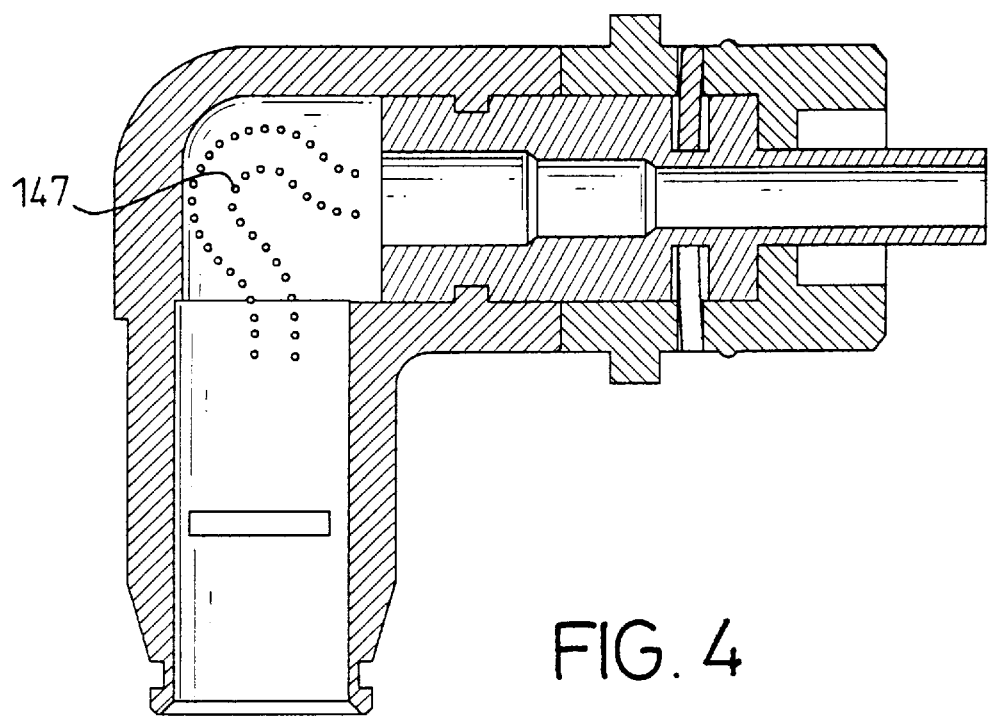
FIG. 4 is a side cross-section of another embodiment of the rotatable L-shaped fiber optic connector in accordance with the present invention.

FIG. 3 shows the internal configuration of the rotatable L-shaped fiber optic connector in accordance with the present invention. The plug (13) also sequentially defines, starting from its front terminal, a narrow hollow segment (135), a medium hollow segment (136) and a wide hollow segment (137) for receiving and positioning the fiber optic wire. Inside the curved portion of the L-shaped body (14), a path (145) is defined to guide the fiber optic wire. In this preferred embodiment, the path (145) is defined by two equally spaced ribs (146) to restrain the fiber optic wire therebetween. However, as shown in FIG. 4, the path (145) can also be defined by two rows of equally spaced posts (147). The path (145) is arcuate such that the fiber optic wire does not make a relatively large angle or acute turn inside the L-shaped body (14). Preferably, the path (145) is designed in such a manner that the fiber optic wire extends from the bottom face (141) to the curved portion of the body (14) to make a turn along an arc with a curvature of ½R~¼R, wherein R is a molding radius in manufacturing the body (14). The fiber optic wire then extends to the outlet face (142) of the body (14) and subsequently into the wide hollow segment (137), the medium hollow segment (136) and the wide hollow segment (135), whereby the filament of the fiber optic wire is exposed at the front terminal of the plug (13). Consequently, the fiber optic wire can be properly bent and received inside the L-shaped fiber optic connector without degrading its transmission performance. In addition, it is preferred to have one or more fixing slots (143) (in this preferred embodiment, only one fixing slot is shown) defined through the L-shaped body (14) in a position between the bottom face (141) and the path (146) to insert a clamp piece (144) to further secure said fiber optic wire. As a result, a rotatable L-shaped fiber optic connector is provided to eliminate the inconvenience in use of a straight-shaped fiber optic connector and still maintain the transmission performance. Moreover, because the head (11) can be freely rotated with respect to the body (14), the use of the fiber optic connector is more convenient.

Although the present invention has been explained in relation to its preferred embodiment, it is to be understood that many other possible modifications and variations can be made without departing from the spirit and scope of the invention as hereinafter claimed.

What is claimed is:

1. A rotatable L-shaped fiber optic connector for connecting a fiber optic wire to a socket, said fiber optic connector comprising:

an L-shaped body having a bottom face and an outlet face, and an arcuate path defined therein configured to guide said fiber optic wire from said bottom face to said outlet face thereby said fiber optic wire being arcuately turned;

a plug having an inner space defined therein, through which said fiber optic wire is inserted, a front portion to expose said fiber optic wire, an end portion embedded into the outlet face of said L-shaped body, and a medium portion with an annular groove defined in a periphery thereof;

a hollow head rotatably arranged around said plug, having an upper wall and a lower wall with an inserting slot defined therethrough; and a locking key disposed in said inserting slot of said head and detachably engaged with the annular groove of said plug.

2. The rotatable L-shaped fiber optic connector as claimed in claim 1, wherein said locking key has a cutout defined therein to be inserted into the inserting slot of said head so that said plug extends through said cutout and the cutout of said locking key is inserted into said annular groove whereby said head is rotatably secured to said plug.

3. The rotatable L-shaped fiber optic connector as claimed in claim 2, wherein said arcuate path is configured such that said fiber optic wire substantially turns along an arc with a curvature of ½R~¼R, said R being a molding radius in manufacturing said L-shaped body.

4. The rotatable L-shaped fiber optic connector as claimed in claim 3, wherein said locking key is slightly bent.

5. The rotatable L-shaped fiber optic connector as claimed in claim 4, wherein said arcuate path is defined by two equally spaced ribs.

6. The rotatable L-shaped fiber optic connector as claimed in claim 5, wherein said arcuate path is defined by two equally spaced rows of posts.

7. The rotatable L-shaped fiber optic connector as claimed in claim 5 further having at least one fixing slot defined through said L-shaped body in which a clamp piece is inserted to secure said fiber optic wire.

8. The rotatable L-shaped fiber optic connector as claimed in claim 6 further having at least one fixing slot defined through said L-shaped body in which a clamp piece is inserted to secure said fiber optic wire.

9. The rotatable L-shaped fiber optic connector as claimed in claim 7, wherein said head is shaped to match with said socket.

10. The rotatable L-shaped fiber optic connector as claimed in claim 8, wherein said head is shaped to match with said socket.

* * * * *